(No Model.)

L. LADD.
MACHINE FOR SEPARATING SEEDS FROM PULP.

No. 318,122. Patented May 19, 1885.

Witnesses:
A. W. Bright
P. B. Turpin

Inventor.
Lafayette Ladd,
by W. E. Witherbee,
Atty.

UNITED STATES PATENT OFFICE.

LAFAYETTE LADD, OF ADRIAN, MICHIGAN.

MACHINE FOR SEPARATING SEEDS FROM PULP.

SPECIFICATION forming part of Letters Patent No. 318,122, dated May 19, 1885.

Application filed January 10, 1885. (No model.)

*To all whom it may concern:*

Be it known that I, LAFAYETTE LADD, a citizen of the United States, residing at Adrian, in the county of Lenawee and State of Michigan, have invented certain new and useful Improvements in Machines for Separating Seeds from Pulp; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
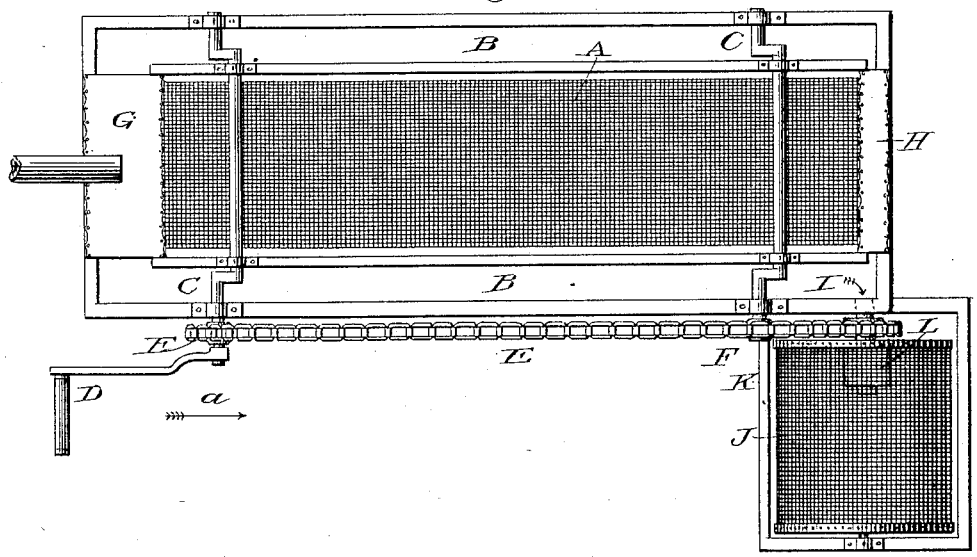
Figure 2:
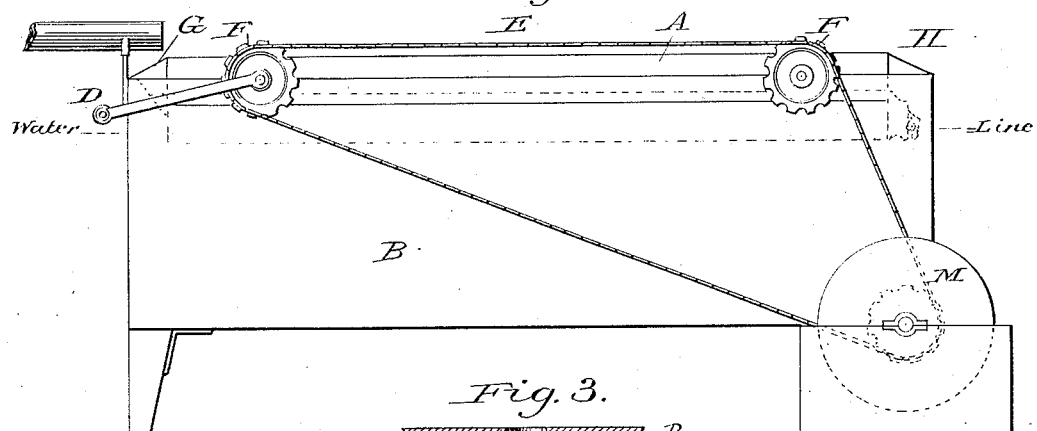
Figure 3:
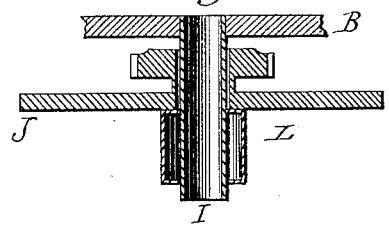

In the drawings, Figure 1 is a top view of my improved machine. Fig. 2 is a side view thereof, and Fig. 3 is a horizontal section through the connection between the tank and the cylindrical sieve.

Like letters designate corresponding parts in both figures.

The pulp which is to be treated is placed on a sieve, A, which is suspended in a tank, B, partly filled with water. This sieve is so arranged that it is given a vertical movement in and out of the water in the tank, and also a backward and forward motion in the tank at the same time. To effect these movements I suspend the sieve from two crank-shafts, C C, the sieve being suspended from the crank portions, as shown. The shafts C C may be rotated by any suitable mechanism. I have shown a hand-crank, D, secured to one end of one shaft, and the two shafts connected by a sprocket-chain, E, which passes over sprocket-wheels F F, secured to the two shafts, respectively, so that both shafts may be rotated simultaneously. Two cloths or aprons are attached to the ends of the sieve and to the ends of the tank, one apron, G, being at the feeding end of the tank, and the other apron, H, at the discharge end of the same. Each apron is attached to the bottom of the sieve and to the upper edge of its end of the tank. The vertical movement of the sieve should be sufficient to raise the bottom of the sieve above the water-line, as is shown in full line in Fig. 2, and to bring the bottom of the sieve considerably below the water-line in the tank when at its lowest point, as is shown by dotted lines in Fig. 2.

The operation of the machine is as follows: The pulp is placed on the sieve and the handle D is turned in a direction similar to that of the hands of a watch. The movement of the crank-shaft carries the sieve upward and forward toward the discharge end of the tank. As the movement is continued the sieve is lowered until its bottom reaches the water-level, when the pulp is floated by the water. The bottom of the sieve is carried by the rotations of the crank-shafts below the water-level, and at the same time backward toward the feeding end of the tank. The pulp, being floated by the water, is not carried back with the sieve. Further movement of the crank-shafts lifts the sieve out of the water, and with it the pulp, and the suction of the water draws the seeds through the meshes of the sieve into the tank below. As the rotation continues the pulp will be repeatedly subjected to the cleansing action of the water, and will be carried with each rotation of the crank-shafts nearer and nearer the discharge end of the tank, in the direction indicated by arrow *a*. Apron H prevents the pulp being discharged into the tank and conducts it over the edge of the tank. The tank is kept supplied with running water from any suitable water-supply. The water is discharged, carrying the seeds with it, through a pipe, I, at the bottom of the tank into a cylindrical sieve or screen, J. The pipe I, fastened firmly to the tank, extends just within the end of the cylindrical sieve and forms a bearing upon which it revolves.

Around the pipe I is a tube, L, of a diameter greater than that of the pipe, which is fastened to the head of the screen inside, to prevent the seeds from falling upon the pipe and being ground. This screen preferably rotates in a box, K. This screen J is rotated by any suitable means, as by the sprocket-chain E, which passes over a sprocket-wheel, M, secured to screen J. The mesh of the screen J is finer than that of the sieve A and retains the seed, but permits the dirt and fine pulp to be discharged into the box K, and the seed is thus washed clean, when it may be taken from the screen J.

I claim as my invention—

1. A water-tank and crank-shafts mounted thereon, in combination with a sieve suspended from said cranks within said tank, whereby said sieve is moved in and out of the water in the tank and is given a forward movement when above the water-line and a backward movement when immersed in the water, substantially as set forth.

2. A tank, B, crank-shafts C C mounted thereon, and a sieve, A, suspended from said cranks within said tank, in combination with an apron, H, attached to the bottom of the sieve and to the discharge end of the tank, substantially as set forth.

3. The tank B and the sieve A, in combination with the cylindrical screen J, and a pipe, I, leading from the tank B into the interior of said screen, and the tube inside of screen J and around pipe I, substantially as set forth.

In testimony whereof I affix my signature in presence of two witnesses.

LAFAYETTE LADD.

Witnesses:
HENRY C. SMITH,
GEO. H. MOORE.